(12) United States Patent
Kusakabe et al.

(10) Patent No.: US 8,515,938 B2
(45) Date of Patent: Aug. 20, 2013

(54) INFORMATION PROCESSING SYSTEM, COLLECTING SERVER, INFORMATION PROCESSING METHOD AND PROGRAM

(75) Inventors: Toshiaki Kusakabe, Tokyo (JP); Satoshi Hiroi, Chiba (JP); Masahiro Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 12/115,869

(22) Filed: May 6, 2008

(65) Prior Publication Data
US 2008/0301103 A1    Dec. 4, 2008

(30) Foreign Application Priority Data
Jun. 4, 2007    (JP) .................................. 2007-148643

(51) Int. Cl.
*G06F 17/00*    (2006.01)

(52) U.S. Cl.
USPC ........... 707/708; 707/706; 707/707; 707/709; 707/710; 707/711; 707/712; 707/713; 707/722; 707/736; 707/758; 707/781

(58) Field of Classification Search
USPC ................. 707/706–713, 722, 736, 758, 781, 707/999.003–999.005
See application file for complete search history.

(56) References Cited

U.S. PATENT DOCUMENTS

| 2003/0050974 A1* | 3/2003 | Mani-Meitav et al. | 709/203 |
| 2005/0076005 A1 | 4/2005 | Chefalas et al. | |
| 2006/0080353 A1 | 4/2006 | Miloushev et al. | |
| 2006/0161635 A1* | 7/2006 | Lamkin et al. | 709/217 |
| 2007/0130308 A1* | 6/2007 | Kim et al. | 709/223 |
| 2007/0143377 A1* | 6/2007 | Waites | 707/205 |
| 2012/0045089 A1* | 2/2012 | Ramos et al. | 382/100 |

FOREIGN PATENT DOCUMENTS

| KR | 10-0724940 | 5/2007 |
| WO | 01/16781 A1 | 3/2001 |

OTHER PUBLICATIONS

European Search Report mailed on Feb. 20, 2012, issued for European Application No. 08 15 7397.4 (English).

* cited by examiner

*Primary Examiner* — Syling Yen
(74) *Attorney, Agent, or Firm* — Oblon, Spivak, McClelland, Maier & Neustadt, L.L.P.

(57) ABSTRACT

An information processing system including, a client capable of receiving and reproducing content from a media server, and a collecting server for receiving content management information on the content from the media server and managing the content management information.

14 Claims, 16 Drawing Sheets

FIG. 18A

| @id | UNIQUE ID ASSIGNED TO EACH CONTENT |
|---|---|
| @parentID | ID OF CONTENT ONE LAYER ABOVE |
| @restricted | INDICATES WHETHER CONTENT IS CHANGEABLE |
| dc:title | TITLE |
| upnp:class | CONTENT TYPE (VIDEO, MUSIC, HOTOGRAPH, FOLDER OR THE LIKE) |

FIG. 18B

| dc:date | DATA AND TIME INFORMATION |
|---|---|
| dc:description | OUTLINE |
| upnp:artist | ARTIST INFORMATION |
| upnp:album | ALBUM INFORMATION |
| upnp:genre | GENRE INFORMATION |
| res | URL OF DESTINATION FOR OBTAINING CONTENT DATA |

INFORMATION PROCESSING SYSTEM, COLLECTING SERVER, INFORMATION PROCESSING METHOD AND PROGRAM

CROSS REFERENCES TO RELATED APPLICATIONS

The present invention contains subject matter related to Japanese Patent Application JP 2007-148643 filed in the Japan Patent Office on Jun. 4, 2007, the entire contents of which being incorporated herein by reference.

BACKGROUND OF THE INVENTION

1. Field of the Invention

The present invention relates to an information processing system including a client capable of receiving and reproducing content from a media server and a collecting server for receiving content management information on the content from the media server and managing the content management information, an information processing method, a computer readable medium, and a collecting server applied to the system.

2. Description of the Related Art

A DLNA (Digital Living Network Alliance) guideline is known as a technical guideline for interconnecting digital AV devices or personal computers in a home network environment. The DLNA guideline defines conditions for connection between a server providing content and a client reproducing the content. Devices conforming to this guideline can be interconnected to share contents by merely connecting a line to the devices without making any special settings.

The DLNA guideline specifies the use of UPnP (Universal Plug and Play) as a protocol for realizing alliance between devices on a network. Contents and content management information are exchanged between a client and a server on the basis of a UPnP AV specification. A user calls up a CDS (Content Directory Service) within the server from a UPnP control point using a Browse command or a Search command to obtain a list of content management information. Then, the user can obtain a desired content by accessing the URL (Uniform Resource Locator) of a location where the content is stored, the URL being included in the list of content management information.

FIG. 14 shows a state in which a DLNA client and a DLNA server (media server) are connected to each other via a network 2 such as a home LAN (Local Area Network) or the like. The DLNA client 10 includes a notebook personal computer 10a (a personal computer will hereinafter be referred to as a PC) and a television receiver 10c. The DLNA client 10 is connected via a network media receiver 15 to a notebook PC 20a, a desktop PC 20b, and a DVD (Digital Versatile Disc) recorder 20c as the DLNA server 20. FIG. 14 shows the notebook PC 20a having a photograph P1, video V1, and music M1 recorded thereon, the desktop PC 20b having a photograph P2, music M2, and video V2 recorded thereon, and the DVD recorder 20c having video V3 recorded thereon.

Because the DLNA client 10 and the DLNA server are connected to each other by a connection system conforming to the DLNA guideline, each of the devices of the DLNA client 10 can read and reproduce the contents such as the photographs, the music, and the video recorded on each of the devices of the DLNA server 20.

When the photograph P2 stored in the DLNA server 20 is to be viewed on the personal computer 10a of the DLNA client 10, for example, it suffices to access the desktop PC 20b storing the photograph P2. In this case, however, the DLNA client 10 side needs to determine which device stores the photograph P2 in advance. Thus, especially when various kinds of DLNA servers 20 store a large amount of contents, for example, it takes time and trouble to find the content.

A known method for solving this problem uses a collecting server to collectively manage content management information in each DLNA server within a house. An example of a system configuration with a collecting server is shown in FIG. 15. In the configuration shown in FIG. 15, the collecting server 30 collectively manages metadata (attribute information) of contents recorded on each device of a DLNA server 20.

In the example shown in FIG. 15, the collecting server 30 classifies contents by content type. The collecting server 30 displays video V1 recorded on a notebook PC 20a, video V2 on a desktop PC 20b, and video V3 on a DVD recorder 20c in a list under a classification of "video". Similarly, the collecting server 30 displays a photograph P1 recorded on the notebook PC 20a and a photograph P2 recorded on the desktop PC 20b in a list under a classification of "photograph". The collecting server 30 displays music M1 recorded on the notebook PC 20a and music M2 recorded on the desktop PC 20b in a list under a classification of "music".

Thus, the collecting server 30 has a function of reclassifying information on recorded contents scattered across the respective devices of the DLNA server 20 by data type, artist or the like and showing the information in a list. Each of the devices of the DLNA client 10 can therefore readily search for a desired content by merely accessing the collecting server 30.

In addition to the above method, various methods are adopted to improve efficiency of content search. For example, Japanese Patent Laid-Open No. 2006-262214 (hereinafter referred to as Patent Document 1) discloses a method of automatically classifying images using metadata of the images when capturing the images from a digital camera into a PC.

As is also described in Patent Document 1, metadata of a still image taken by a digital camera, a portable telephone terminal or the like, in particular, is often only a photographing date and a title automatically given to the still image by the device. FIG. 16 shows a list of still images displayed on the collecting server 30. A screen shown in FIG. 16 displays thumbnails of the images on a left side of the screen, titles of the images such as DSC0005.JPG and the like next to the thumbnails, and photographing dates and times such as 2005/ 9/3 6:40 PM and the like.

However, it may be difficult to retrieve a desired image with only information as shown in FIG. 16 as a key. This is because photographing dates and times, the titles of images and the like are often classifications meaningless to the user.

Some types of DLNA clients 10 show a content hierarchical structure referred to as CDS (Container Directory Service) within the DLNA server 20 as it is on a menu screen operated by the user. CDS is a structure as shown in FIG. 17, for example, in which structure folders referred to as containers are connected to each other in a hierarchy. Some containers exist singly as containers, and some containers include real files of contents referred to as items. Incidentally, containers and items are both also referred to generically as objects.

In the example shown in FIG. 17, a container C1 named "RECORDED VIDEO" and a container C2 named "ALBUM LIST" are under a root container C0. A container C3 named "ALBUM 1" and a container C4 named "ALBUM 2" are connected under the container C2. Further, a container C5 named "EXTRAS" is connected to the container C3. The container C1 stores items It1 and It2 as video contents, the container C3 stores items It3, It4, and It5 as photographic contents, and the container C4 stores an item It6 as photographic content. That is, CDS shows folder names and a hierarchy created by a user as they are stored, and folder names in CDS are often meaningful to the user.

When such a hierarchy is displayed on a menu screen, the user can reach a desired photograph by tracing the hierarchy. However, the user often needs to move between layers many times before reaching the desired photograph, and thus it cannot be said that operability is good.

It is possible that CDS has metadata other than photographing dates and titles. When such metadata can be added to search conditions, search efficiency should be improved. FIG. 18A shows five kinds of essential metadata. FIG. 18B shows metadata that can be added arbitrarily.

The essential metadata includes @id as a unique ID assigned to each content, @parentID as the ID of content one layer above the content, @restricted indicating whether the content is changeable, dc:title indicating a title, and upnp: class indicating the type of the content. The metadata that can be added arbitrarily includes, for example, dc:date indicating date and time information, dc:description indicating an outline, upnp:artist indicating artist information, upnp:album indicating album information, upnp:genre indicating genre information, and res as the URL of a destination for obtaining content data.

However, while items that seem to be useable as content search keys can be added as arbitrarily addable metadata, the added items cannot be used as search items unless the meanings of the items are shared with the DLNA client 10. However, there is no common framework for DLNA for sharing such information. It can therefore be said that sharing metadata added as extension information between various devices forming the DLNA client 10 and the DLNA server 20 is impossible in the present situation.

SUMMARY OF THE INVENTION

The present invention has been made in view of the above. It is desirable to provide a system in which a user can easily search for content.

According to an embodiment of the present invention, an information processing system includes:

a client configured to receive that reproduce content from a media server; and a collecting server configured to receive content management information on the content from the media server and managing the content management information;

wherein the client includes a communication unit configured to transmit a search condition for retrieving the content to the collecting server, and to receive a list of content information corresponding to the search condition, the collecting server includes a receiving unit configured to obtain the content management information from the media server according to a predetermined condition, a content information database generating unit configured to store information on a content storage location which information is included in the obtained content management information as category information of the content, and to generate a content information database, a content information list generating unit configured to, when receiving a search condition transmitted from the client, extract content information matching the search condition from the content information database on a basis of the category information, and to generate a list of the content information, and a transmitting unit configured to transmit the list of the content information generated by the content information list generating unit to the client.

According to another embodiment of the present invention, a collecting server is provided in an information processing system, the information processing system including a client capable of receiving and reproducing content from a media server and a collecting server for receiving content management information on the content from the media server and managing the content management information, the collecting server including:

a receiving unit configured to obtain the content management information from the media server according to a predetermined condition;

a content information database generating unit configured to store information on a content storage location which information is included in the obtained content management information as category information of the content, and to generate a content information database;

a content information list generating unit configured to, when receiving a search condition transmitted from the client, extract content information matching the search condition from the content information database on a basis of the category information, and to generate a list of the content information; and a transmitting unit configured to transmit the list of the content information generated by the content information list generating unit to the client.

According to yet another embodiment of the present invention, an information processing method of a collecting server in an information processing system is provided, the information processing system including a client capable of receiving and reproducing content from a media server and a collecting server for receiving content management information on the content from the media server and managing the content management information, the information processing method including:

obtaining the content management information from the media server according to a predetermined condition;

storing information on a content storage location which information is included in the obtained content management information as category information of the content;

extracting content information matching the search condition on a basis of the category information and generating a list of the content information when receiving a search condition for the content from the client; and transmitting the generated list of the content information to the client.

According to yet another embodiment of the present invention, a computer readable medium is provided. The computer readable medium stores a program which, when loaded on a processor cause the processor to execute a method for implementing and performing an information process of a collecting server in an information processing system on a computer, the information processing system including a client capable of receiving and reproducing content from a media server and a collecting server for receiving content management information on the content from the media server and managing the content management information, the method comprising:

obtaining the content management information from the media server according to a predetermined condition;

storing information on a content storage location which information is included in the obtained content management information as category information of the content;

extracting content information matching the search condition on a basis of the category information and generating a list of the content information when receiving a search condition for the content from the client; and transmitting the generated list of the content information to the client.

According to the present invention, a folder name given intentionally by a user can be used as a key at a time of a content search, so that efficiency of content search can be improved.

BRIEF DESCRIPTION OF THE DRAWINGS

FIGS. 18A and 18B are diagrams of assistance in explaining an example of structure of metadata of the past.

DETAILED DESCRIPTION OF THE PREFERRED EMBODIMENTS

Figure 1:
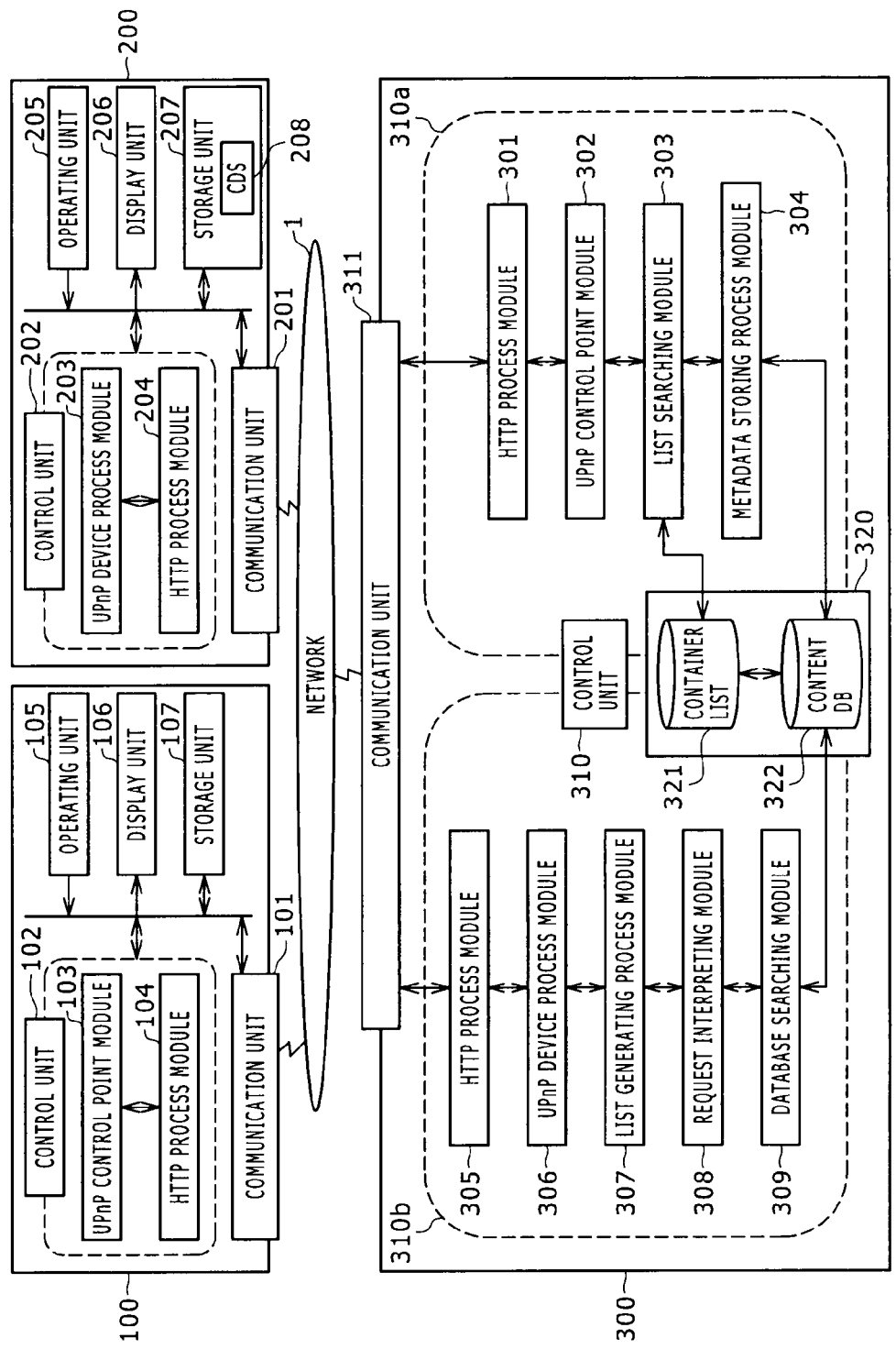
FIG. 1 is a block diagram showing an example of configuration of a system according to an embodiment of the present invention.
Figure 15:
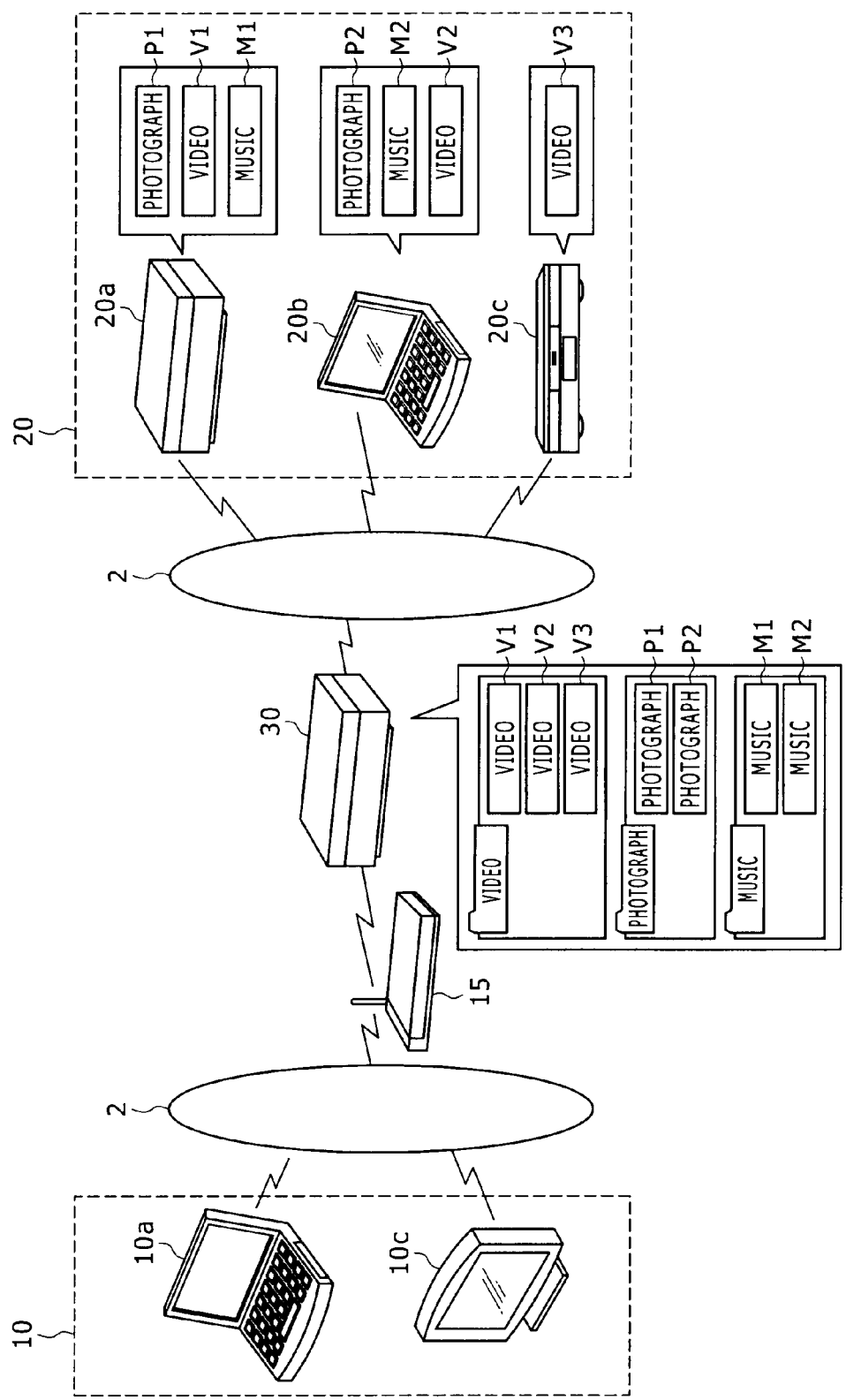
FIG. 15 is a block diagram showing an example of configuration of a system using a collecting server of the past.
Figure 16:
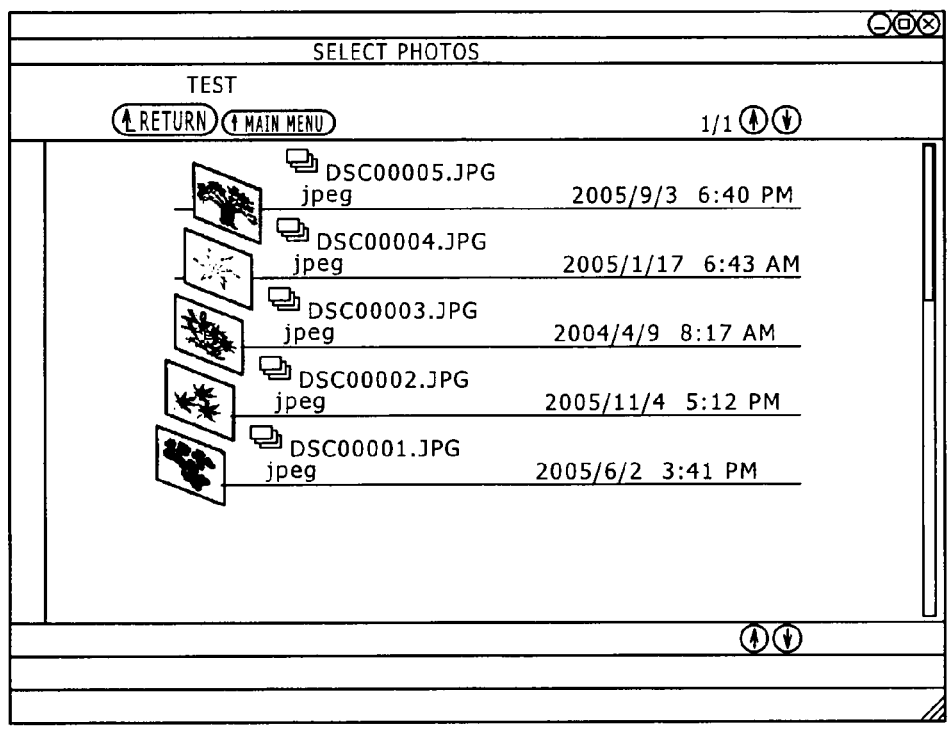
FIG. 16 is a diagram of assistance in explaining an example of screen display of the past.

An embodiment of the present invention will hereinafter be described with reference to FIGS. 1 to 10. FIG. 1 shows an example of internal configuration of the embodiment. Incidentally, in the configuration shown in FIG. 15, a notebook PC and a television receiver are used as a DLNA client, a desktop PC, a notebook PC, and a DVD recorder are used as a DLNA server, and a desktop PC is used as a collecting server. However, the device configuration is not limited to the example shown in FIG. 15.

In a system shown in FIG. 1, a DLNA client 100 and a DLNA server 200 are each connected to a collecting server 300. The collecting server 300 collects content management information from the DLNA server 200, and distributes the collected content management information to the DLNA client 100.

The DLNA client 100 includes: a communication unit 101 as a connection interface with a network 1; a control unit 102 for controlling communication performed by the communication unit 101 and controlling various parts of the DLNA client 100; an operating unit 105 for receiving an operating input from a user; a display unit 106 for displaying content management information obtained from the collecting server 300 as well as content such as a photograph, video and the like selected by the user from the content management information; and a storage unit 107 for storing content data and the like.

The control unit 102 includes an HTTP process module 104 and a UPnP control point module 103. The HTTP process module 104 performs processes of an HTTP client. The HTTP process module 104 generates a command such as a GET command or the like, and generates a display screen on the basis of XML (Extensible Markup Language) and image data included in a response message transmitted in response to a command. The UPnP control point module 103 detects a UPnP-ready device connected to the network 1, and generates a Browse command to obtain CDS information within the DLNA server 200, for example.

The DLNA server 200 includes a communication unit 201, a control unit 202, an operating unit 205, a display unit 206, and a storage unit 207. The communication unit 201, the operating unit 205, and the display unit 206 may have the same configurations as in the DLNA client 100. The storage unit 207 stores contents such as photographs, music, video, and the like, and stores CDS 208 having attribute information of these contents and a hierarchical structure thereof.

The control unit 202 includes an HTTP process module 204 and a UPnP device process module 203. The HTTP process module 204 performs processes of an HTTP server. The HTTP process module 204 performs a process of analyzing and responding to a command transmitted from the DLNA client 100. When a Browse command is received, the HTTP process module 204 performs for example a process of transmitting content management information stored in the storage unit 207.

The collecting server 300 includes a communication unit 311, a control unit 310, and a storage unit 320. In the example shown in FIG. 1, the collecting server 300 is configured without an operating unit or a display unit. However, the collecting server 300 may be a device having these units. The storage unit 320 stores a container list 321 (folder name storage unit) and a content database 322 (hereinafter referred to as a content DB 322). When content management information transmitted from the DLNA server 200 includes a container, the name of the container is written to the container list 321.

The content DB 322 is a database generated by associating an item as a real content with the name of a container (parent container) storing the item on the basis of the information of CDS 208 possessed by the DLNA server 200 and recording the name of the container as metadata of the item in the content DB 322. Details of a configuration of the content DB 322 will be described later.

The control unit 310 includes: a collecting module 310a for obtaining content management information from the DLNA server 200 and passing the content management information to the content DB 322; and a list transmitting module 310b for generating a category list or a content information list (object list) on the basis of information recorded in the content DB 322 in response to a request from the DLNA client 100, and transmitting the generated list to the DLNA client 100.

The collecting module 310a includes an HTTP process module 301, an UPnP control point module 302, a list searching module 303 (content information searching unit) and a metadata storing process module 304 (content information database generating unit).

The collecting module 310a performs a process with the collecting module 310a functioning as a client, whereas the DLNA server 200 is a server. Thus, the HTTP process module 301 and the UPnP control point module 302 perform the same processes as the HTTP process module 104 and the UPnP control point module 103 in the DLNA client 100. The list searching module 303 analyzes CDS information received from the DLNA server 200 to determine whether each object forming the CDS information is a container or an item, and performs an appropriate process on the basis of a result of the determination.

When an object detected by the list searching module 303 is an item, the metadata storing process module 304 performs a process of associating the detected item with the name of the parent container of the detected item, and recording the name of the parent container as metadata of the item in the content DB 322. Details of the processes in the list searching module 303 and the metadata storing process module 304 will be described later.

The list transmitting module 310b includes an HTTP process module 305, a UPnP device process module 306, a list generating process module 307 (list generating unit), a request interpreting module 308, and a database searching module 309. The list transmitting module 310b performs a process with the list transmitting module 310b positioned as server of the DLNA client 100. Thus, the HTTP process module 305 and the UPnP device process module 306 may perform the same processes as the HTTP process module 204 and the UPnP device process module 203 in the DLNA server 200.

The request interpreting module 308 analyzes the description of a command transmitted from the DLNA client 100, and determines a type of information to be included in a list. The database searching module 309 performs a process of extracting data of the type determined by the request interpreting module 308 from the content DB 322. The list generating process module 307 performs a process of generating a category list or an object list on the basis of the data extracted by the database searching module 309, and rewriting the category list or the object list into a format conforming to UPnP. Details of the processes performed by the request interpreting module 308, the database searching module 309, and the list generating process module 307 will be described later.

Next, referring to flowcharts of FIGS. 2 to 5, description will be made of a flow of a process in which the collecting server 300 obtains content management information from the DLNA server 200 and transmits a category list and an object list to the DLNA client 100, and the DLNA client 100 obtains a real content.

Figure 2:
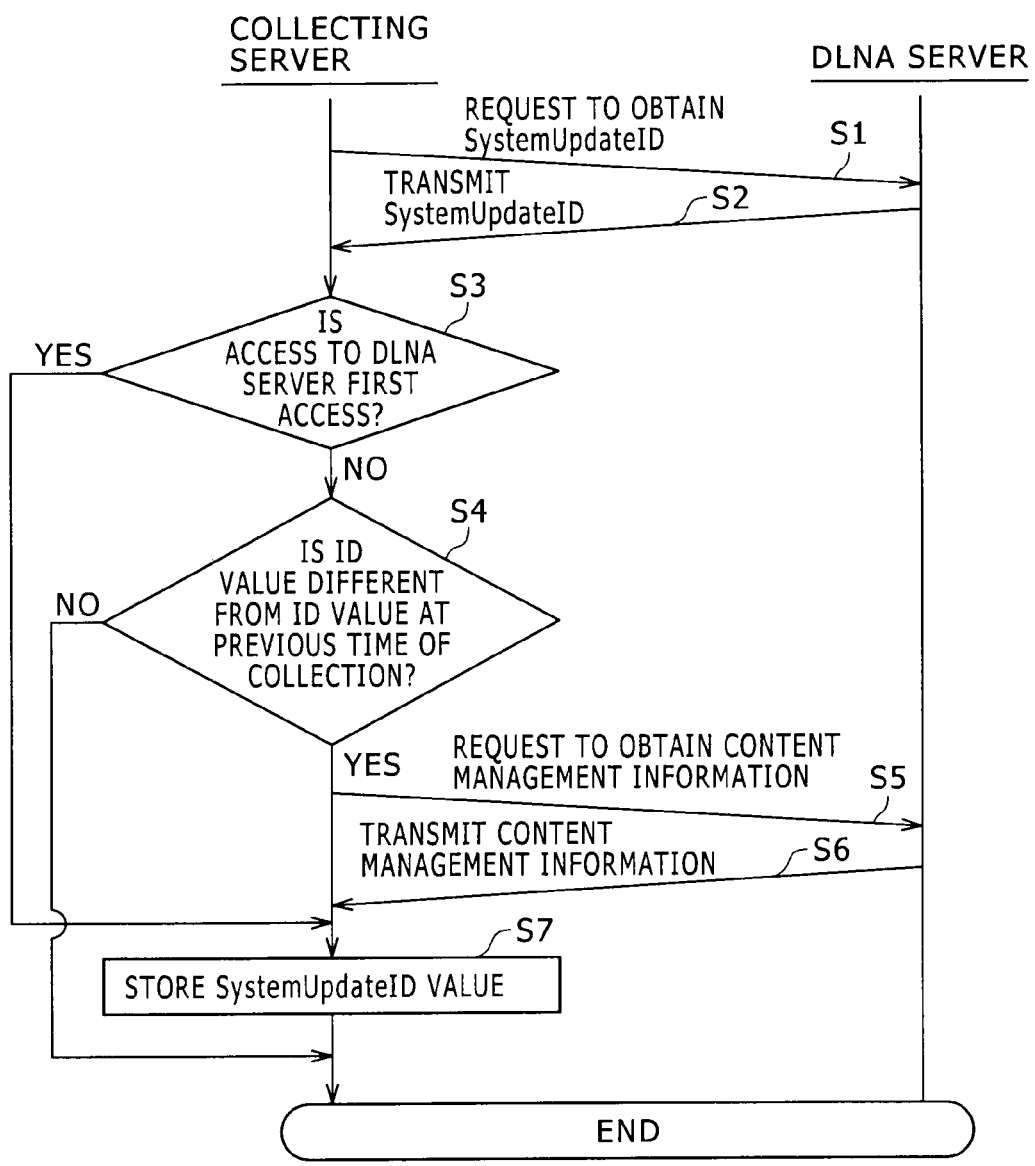
FIG. 2 is a flowchart representing an example of a content information obtaining and determining process by a collecting server according to an embodiment of the present invention.

FIG. 2 shows an example of a process in which the collecting server 300 obtains content management information from the DLNA server 200. The collecting server 300 transmits a request to obtain a SystemUpdateID to the DLNA server 200 at predetermined intervals of one hour or the like, which intervals are set by a user (step S1). The SystemUpdateID is the value of an arbitrary positive integer possessed by the DLNA server 200, and is a value changed by the DLNA server 200 when contents of the DLNA server 200 itself are added, deleted, or updated, for example.

After receiving the request to obtain the ID value from the collecting server 300, the DLNA server 200 returns the SystemUpdateID to the collecting server 300 (step S2). After obtaining the SystemUpdateID, the collecting server 300 determines whether the access to the DLNA server 200 is a first access (step S3). When the access to the DLNA server 200 is a first access, Yes is selected, and the obtained SystemUpdateID value is stored (step S7).

When the access to the DLNA server 200 is a second access or an access subsequent to the second access, the collecting server 300 compares the obtained SystemUpdateID value with an already stored SystemUpdateID value to determine whether there is a difference between the two values (step S4). When it is determined that the two values are the same, this means that updating of contents or the like is not performed in the DLNA server 200, and therefore the process is ended directly without any operation being performed. When the two values are different from each other, the collecting server 300 transmits a request to obtain content management information to the DLNA server 200 (step S5). After the content management information is transmitted from the DLNA server 200 (step S6), the collecting server 300 obtains the content management information, and overwrites the previous SystemUpdateID value with the obtained SystemUpdateID value (step S7). That is, only when contents are added, deleted, or updated, for example, in the DLNA server 200, content management information is collected.

Figure 3:
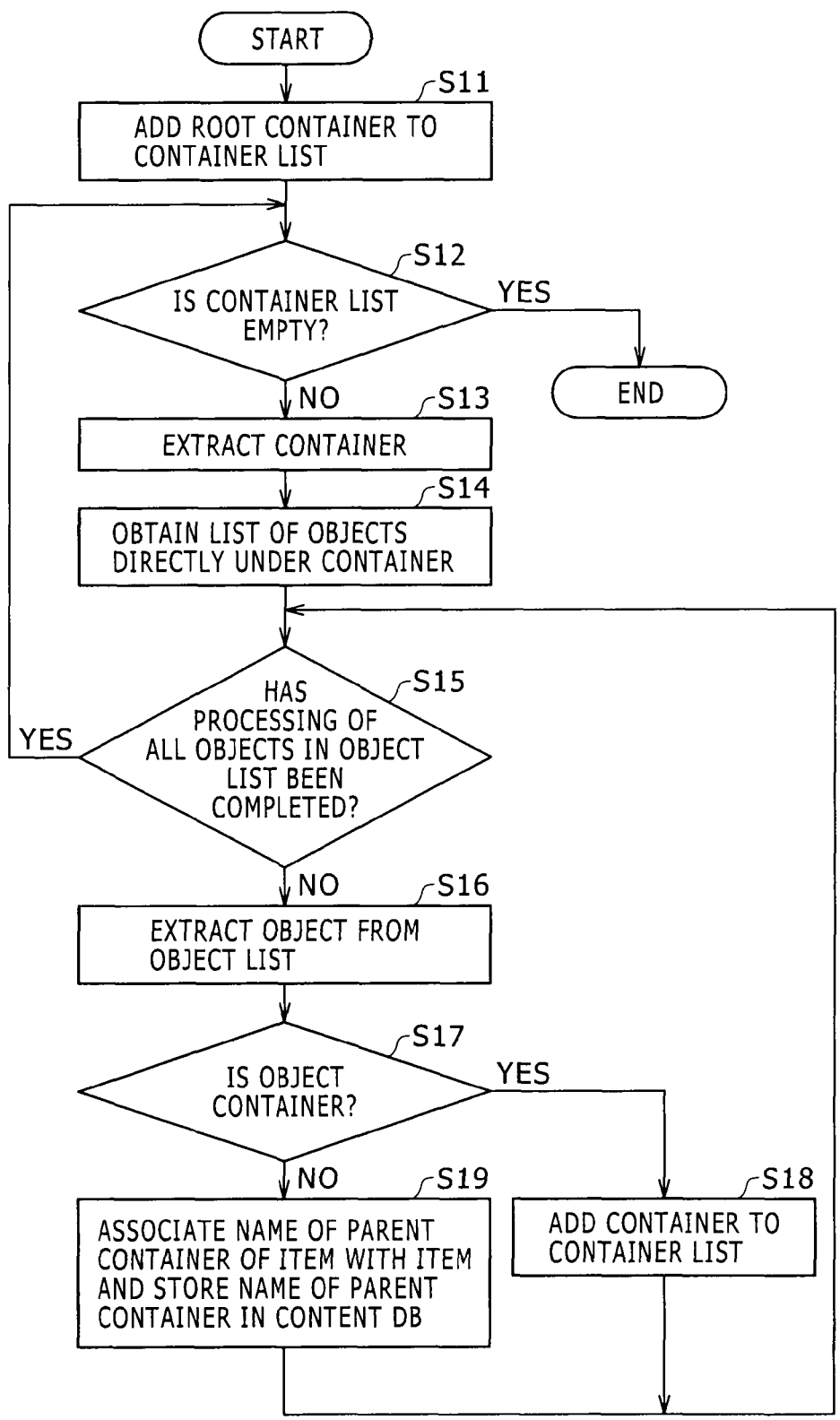
FIG. 3 is a flowchart representing an example of a process of generating a content database in the collecting server according to an embodiment of the present invention.

Next, referring to a flowchart of FIG. 3, description will be made of an example of a process of generating the content DB 322 in the collecting server 300. The process shown in FIG. 3 is performed after the content management information transmitted from the DLNA server 200 in step S6 of FIG. 2 is obtained.

Figure 17:
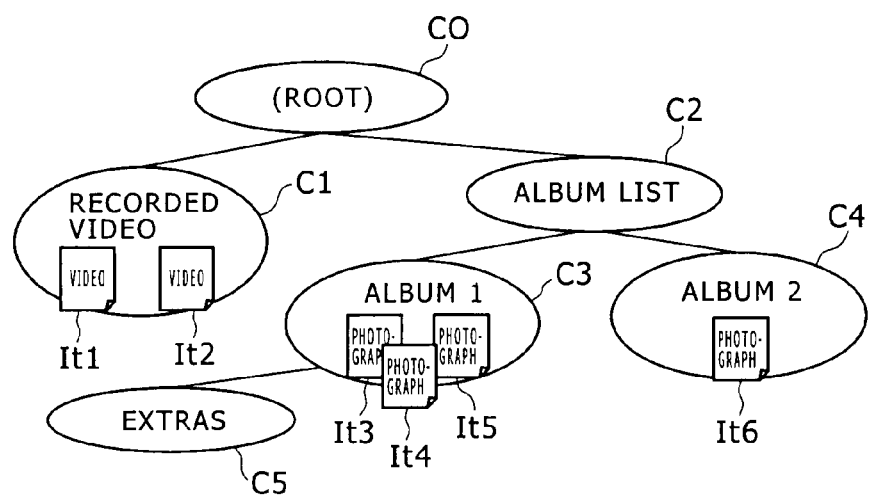
FIG. 17 is a diagram of assistance in explaining an example of structure of a content information list of the past.

After obtaining the content management information, the collecting server 300 first adds the name of a root container to the container list 321 (step S11). When the obtained content management information has a structure as shown in FIG. 17, "root" is written in the container list. The collecting server 300 next determines whether the container list 321 is empty (step S12). When a process to be described later is completed, the container list 321 is empty. In this case, Yes is selected, and thereby the process is ended.

When it is determined that the container list is not empty, the collecting server 300 extracts one container from the obtained content management information (step S13). The collecting server 300 obtains a list of objects directly under the container (step S14). Making description using the example shown in FIG. 17, when the extracted container is the root container C0, the collecting server 300 in step S14 obtains information on the containers C1 to C4 directly under the root container C0. When the extracted container is the container C1, the collecting server 300 obtains information on the item It1 and the item It2 stored in the container C1. In one embodiment, the container analysis is sequentially performed from a top layer to a lower layer of the hierarchy.

The collecting server 300 next determines whether a process to be described later has been performed on all the objects in the object list (step S15). When it is determined that the process has not been performed, the collecting server 300 extracts one object from the object list (step S16). The collecting server 300 then determines whether the extracted object is a container (step S17).

When the extracted object is a container, the collecting server 300 adds the name of the container to the container list 321 (step S18). When the extracted object is not a container but an item, the collecting server 300 associates the name of a parent container storing the item with the item, and stores the name of the parent container as metadata of the item in the content DB 322 (step S19). The name of the parent container in this case is the name of the container extracted from the container list in step S16.

After performing the process of step S18 and step S19, the collecting server 300 returns to step S15 to determine whether the process of step S17 and step S18 or step S19 has been performed on all the objects in the object list. When it is determined that the process has been performed on all the objects, the collecting server 300 selects Yes to return to step S12. When it is determined in step S12 that the container list 321 is empty, the process is ended. Of the above-described steps, the processes of step S16 and step S17 are performed in the list searching module 303, and the process of step S19 is performed in the metadata storing process module 304.

Such a process associates the item with the name of the parent container storing the item, and stores the name of the parent container as metadata of the item. Information registered as metadata can also be used as a key at a time of a search. Hence, the name of the parent container which name is often meaningful to the user can be used as a key at a time of a content search.

Next, the information actually transmitted from the DLNA server 200 and the container list 321 or the content DB 322 generated in the collecting server 300 when the process described with reference to FIG. 3 is performed will be described with reference to FIG. 4 while providing concrete examples.

Description will first be made of a process when the container extracted in step S13 of FIG. 3 is a root container. In step S21 of FIG. 4, a root container is extracted from the container list 321. A request to transmit an object list is sent to the DLNA server 200 (step S22). In this case, a Browse command is used, and 0, which is the ID of the root container, is specified in the command.

Figure 4:
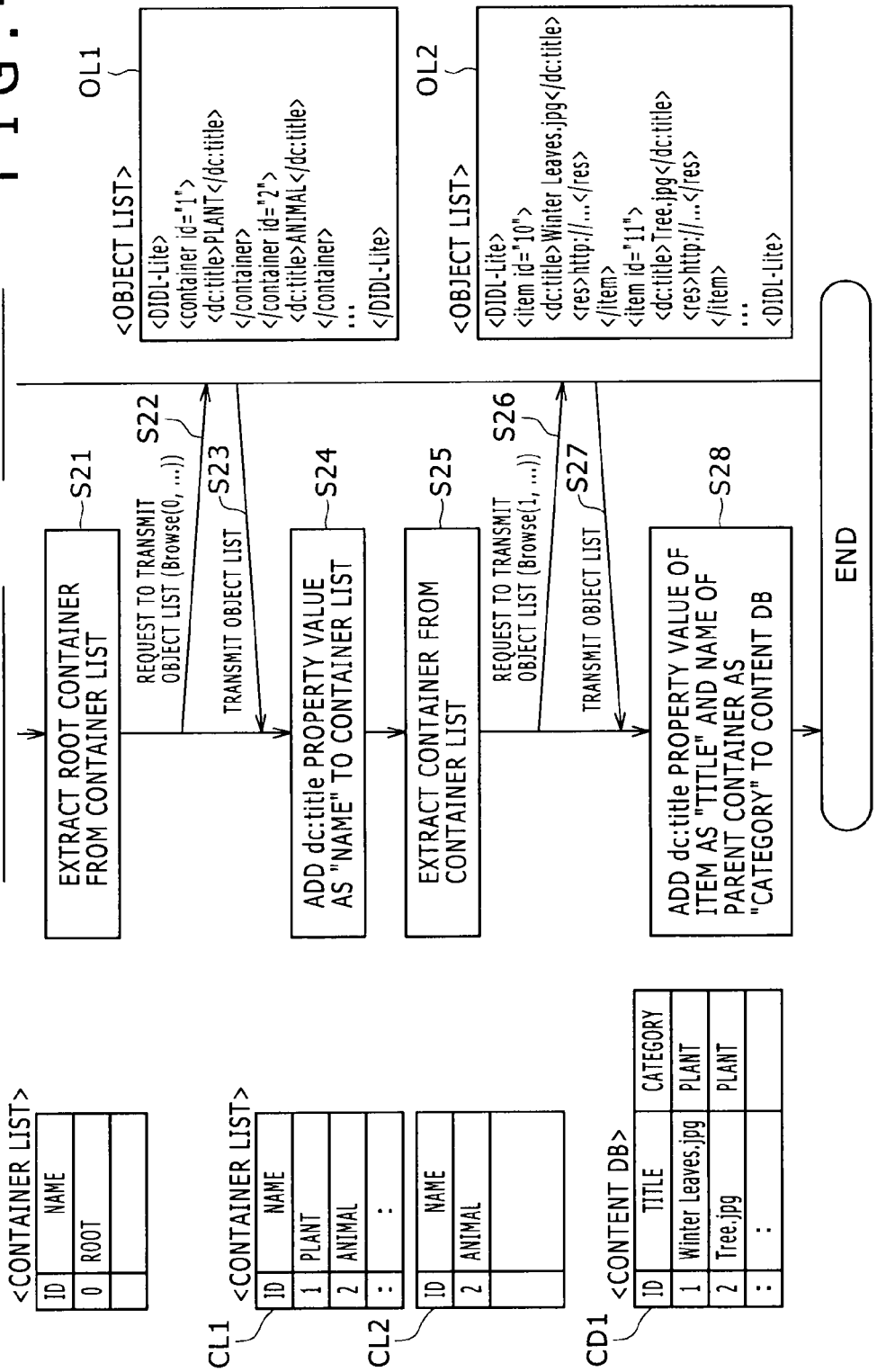
FIG. 4 is a flowchart representing an example of a process of generating a content database according to an embodiment of the present invention.

Receiving the request to transmit an object list, the DLNA server 200 returns an XML description indicated by OL1 in FIG. 4 as the object list (step S23). The object list OL1 includes the IDs and the names of respective containers. The name of a container is shown as a property value of "dc:title".

Then, receiving the object list, the collecting server 300 adds the property values of "dc:title" as the names of the containers to the container list 321 (step S24). The container list generated on the basis of the object list OL1 is shown as container list CL1. That is, "PLANT" and "ANIMAL" as the property values of "dc:title" are added as "NAME" in the container list.

Then, one container of "PLANT" is extracted from the container list (step S25), and a request to obtain a list of objects directly under the extracted container of "PLANT" is transmitted from the collecting server 300 to the DLNA server 200 (step S26). Because the container of "PLANT" is extracted in step S25, only "ANIMAL" with an ID of 2 is left in a container list CL2 shown on a left side of FIG. 4.

"PLANT" has a container ID of 1. Therefore 1 is specified in a Browse command transmitted to the DLNA server 200 in step S26. Receiving the Browse command in which 1 is specified, the DLNA server 200 extracts objects directly under the container of the name of "PLANT" which container has the container id of 1, generates an object list as indicated by OL2 in FIG. 4, and then transmits the generated object list to the collecting server 300 (step S27). The object list OL2 includes information on items, as indicated by a description "item id 10". Thus, the collecting server 300 writes the dc:title property values of the items as titles of the items to a content database CD1. At the same time, the name of the parent container, that is, the "NAME" extracted from the container list in step S25 is written as "CATEGORY" to the content database CD1 (step S28).

The object list OL2 includes descriptions "Winter Leaves.jpg" and "Tree.jpg" as the names of the items, and the name of the parent container storing these items is "PLANT". The content database CD1 thus stores the names of the items as titles and stores the name of the parent container as a category.

Next, an example in which the collecting server 300 transmits a category list on the basis of a content search request from the DLNA client 100 will be described with reference to a flowchart of FIG. 5. First, when "CATEGORY" is selected (step S30) as a content search key on a menu screen displayed on the display unit 106 in the DLNA client 100 (see FIG. 1), a request to obtain category information is transmitted from the DLNA client 100 to the collecting server 300 (step S31). The request transmitted in this case is a Browse command, and "CategoryList" is specified in the command.

Figure 6:
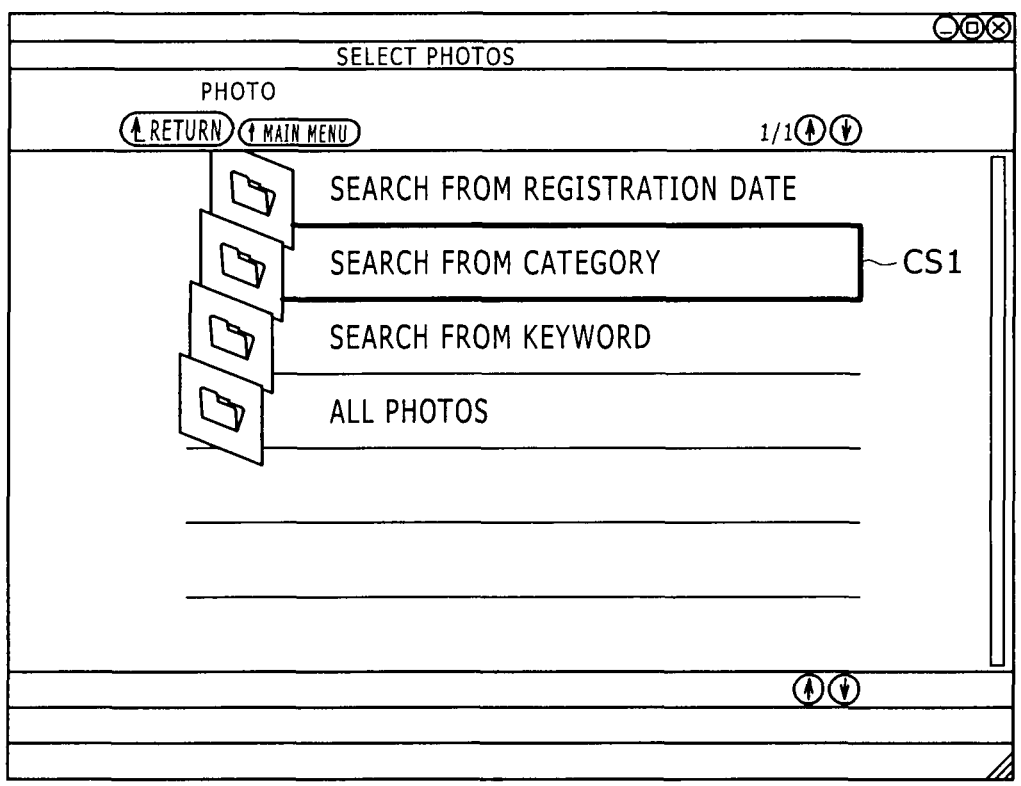
FIG. 6 is a diagram of assistance in explaining an example of a search screen according to an embodiment of the present invention.

FIG. 6 shows an example of the menu screen. In the example shown in FIG. 6, items "SEARCH FROM REGISTRATION DATE", "SEARCH FROM CATEGORY", "SEARCH FROM KEYWORD", and "ALL PHOTOS" are shown as types of content search keys from the top. The user can select a desired key by moving up or down a cursor CS1 on the screen shown in FIG. 6.

Receiving the request to obtain category information from the DLNA client 100, the collecting server 300 extracts categories from the content DB 322. When the extracted categories include a duplication, the collecting server 300 eliminates the duplication (step S32). For example, when the collecting server 300 extracts "ANIMAL", "PLANT", "ENTRANCE CEREMONY", and "ANIMAL" as categories, the collecting server 300 extracts only one category of "ANIMAL". The collecting server 300 then generates a category list on the basis of the extracted information (step S33).

Figure 5:
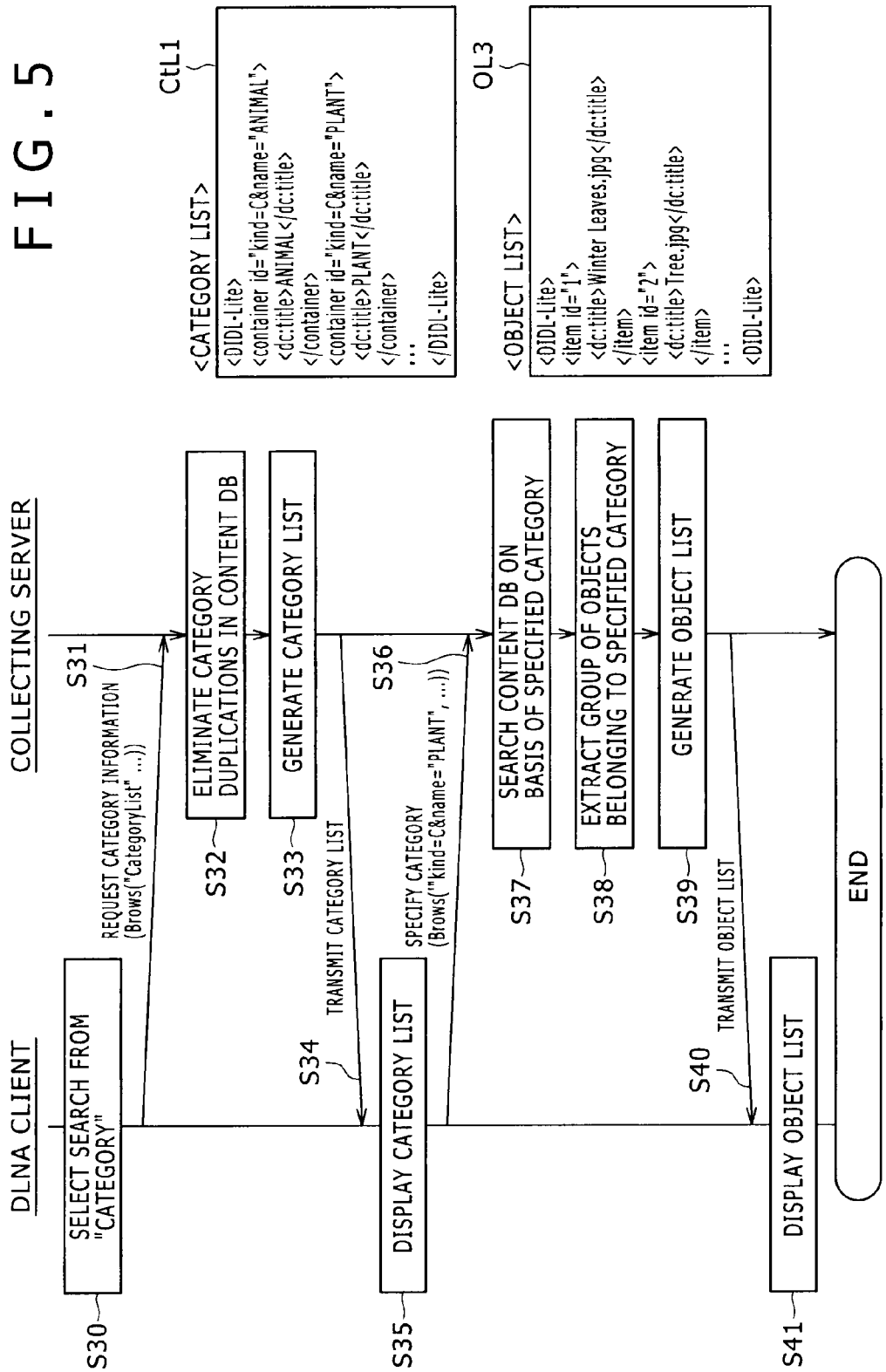
FIG. 5 is a flowchart representing an example of a process of generating and transmitting an object list according to an embodiment of the present invention.

The category list generated in step S33 is shown as a category list CtL1 in FIG. 5, for example. 'kind=C&name="ANIMAL"' and 'kind=C&name="PLANT"' are specified as container IDs, and "ANIMAL" and "PLANT" are specified as dc:title property values. Such a category list is transmitted from the collecting server 300 to the DLNA client 100 (step S34).

The DLNA client 100 displays the category list on the basis of the message sent from the collecting server 300 in step S34 (step S35). Then, container id values and dc:title values included in the received category list are stored as IDs and category names, respectively, in the storage unit 107 (see FIG. 1) or the like.

Figure 7:
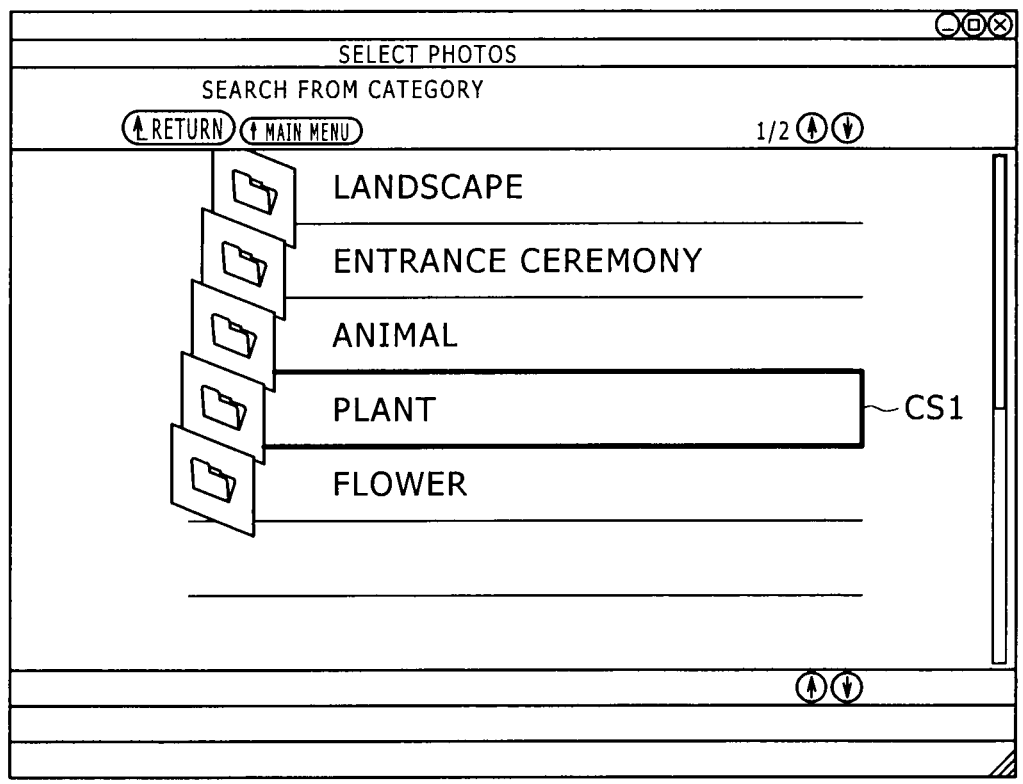
FIG. 7 is a diagram of assistance in explaining an example of display of a category list according to an embodiment of the present invention.

The category list displayed in step S35 is shown in FIG. 7, for example. In FIG. 7, items "LANDSCAPE", "ENTRANCE CEREMONY", "ANIMAL", "PLANT", and "FLOWER" are displayed from the top of the screen. These items reflect the dc:title property values included in the category list transmitted from the collecting server 300 in step S34.

When "PLANT", for example, is selected on such a screen on the basis of an operation of the user, information on the specified category is transmitted from the DLNA client 100 to the collecting server 300 (step S36). A Browse command is also used in this case, and 'kind=C&name="PLANT"' is specified as an ID in the command. The container id included in the category list transmitted from the collecting server 300 is used as it is for this ID.

Receiving the category specifying information transmitted from the DLNA client 100, the collecting server 300 searches the content DB 322 with the specified category of "PLANT" as a key (step S37). Then, the collecting server 300 extracts a group of objects belonging to the specified category of "PLANT" from the content DB 322 (step S38), and generates an object list using the extracted group of objects (step S39). The collecting server 300 then transmits the object list to the DLNA client 100 (step S40).

The process of steps S37 to S39 is performed as a result of interpreting 'kind=C&name="PLANT"' included in the Browse command transmitted from the DLNA client 100. That is, 'kind=C&name="PLANT"' also functions as a command directed to the collecting server 300. The command orders the searching of the content DB 322 on the basis of the category "PLANT" and generation of a list using an extracted result.

In anticipation of a reply in such a form to the message sent by the collecting server 300 to the DLNA client 100, the collecting server 300 transmits the message including the meaning of a command in a container id in advance.

The object list generated in step S39 is shown as an object list OL3 in FIG. 5, for example. The object list OL3 includes values such as "Winter Leaves.jpg" and "Tree.jpg" as dc:title property values. These values represent the names of items, that is, real contents. Then, an object list as shown in FIG. 8 is displayed on the display unit 106 of the DLNA client 100 (step S41).

Figure 8:
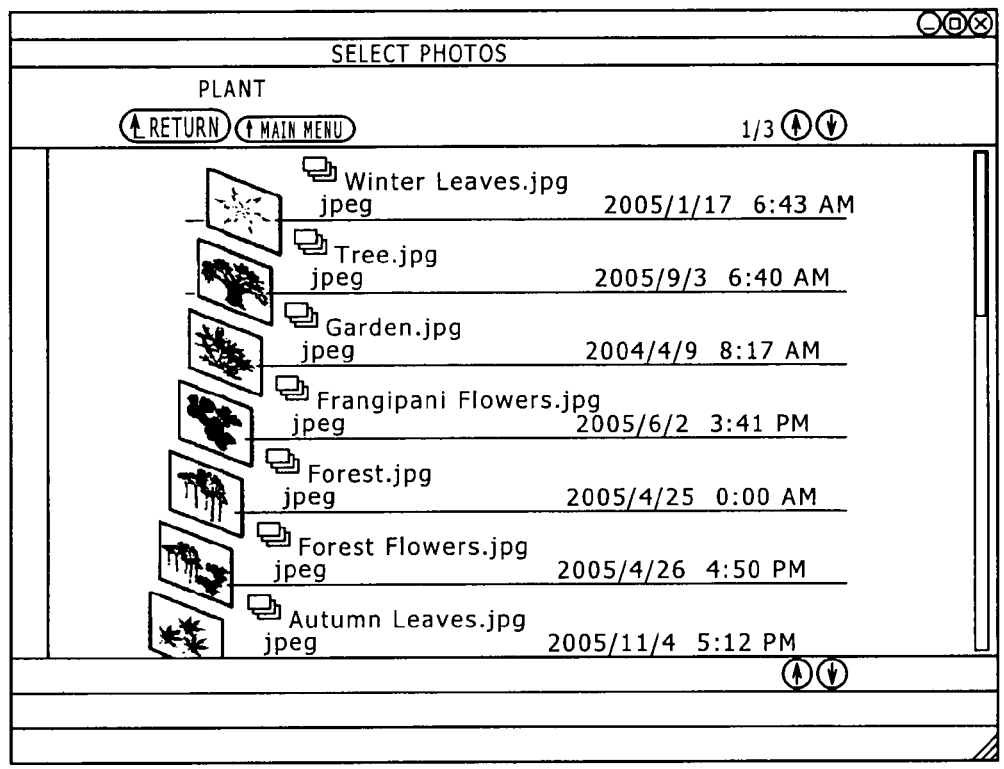
FIG. 8 is a diagram of assistance in explaining an example of display of an object list according to an embodiment of the present invention.

In the object list shown in FIG. 8, thumbnails of contents are displayed on the left side of a screen, and the names of the contents, such as "Winter Leaves.jpg" and the like, and photographing times of the contents, such as 2005/1/17 6:43 AM and the like, are shown on the right side of the screen. Though the information of the photographing times and the like is not shown in the object list OL3 shown in FIG. 5, suppose that the message transmitted from the collecting server 300 to the DLNA client 100 in step S40 includes the photographing time information and the information of URLs or the like as information on locations where the contents are stored. The DLNA client 100 generates and displays a list of content information using the information described in the object list transmitted to the DLNA client 100.

It is noted that each of the objects have different names, and are presumably different content. If identical content is stored in multiple places on a network, multiple objects with the same name may appear on a display such as that shown in FIG. 8. However, as these identical objects are stored in different places, they will have different metadata. A display that also displays some of the metadata for each object will allow a user to determine which version of the identical objects corresponds to each entry.

Figure 9:
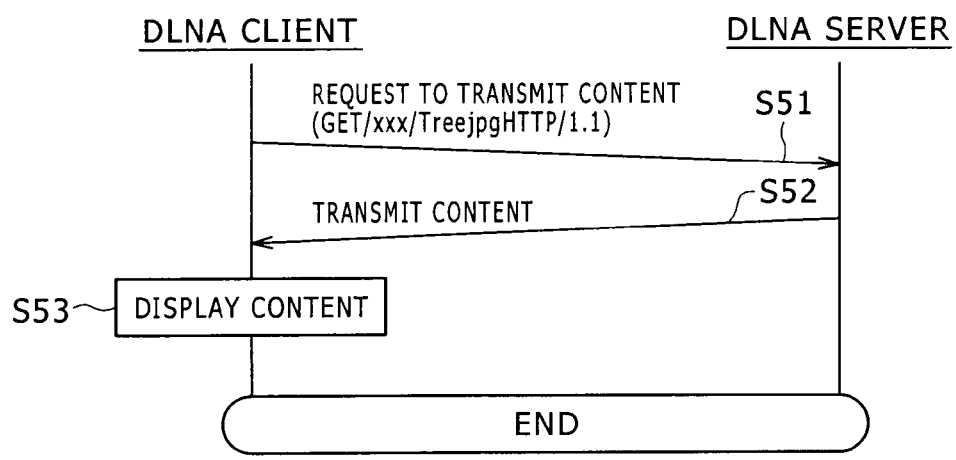
FIG. 9 is a flowchart representing an example of a process of obtaining content by a DLNA client according to an embodiment of the present invention.

Next, referring to a flowchart of FIG. 9, description will be made of an example of a process when the DLNA client 100 actually obtains a real content. Taking as an example a case where the user selects "Tree.jpg" on the screen shown in FIG. 8, a request to transmit the content is first transmitted from the DLNA client 100 to the DLNA server 200 (step S51). The command transmitted in this case is a GET command, and a URL indicating a location where "Tree.jpg" is stored is specified in the command. This URL is included in the object list transmitted from the collecting server 300 in step S40 of the flowchart of FIG. 5.

Receiving the sent request to transmit the content from the DLNA client 100, the DLNA server 200 reads the content specified in the request, and then transmits the content to the DLNA client 100 (step S52). The DLNA client 100 then displays the sent content on the display unit 106 (step S53).

Thus, the collecting server 300 associates an item with the name of a container storing the item on the basis of the content management information of the DLNA server 200, and stores the name of the container as metadata of the item. It is therefore possible to search for the item, that is, the real content on the basis of the name of the container storing the item.

Figure 10:
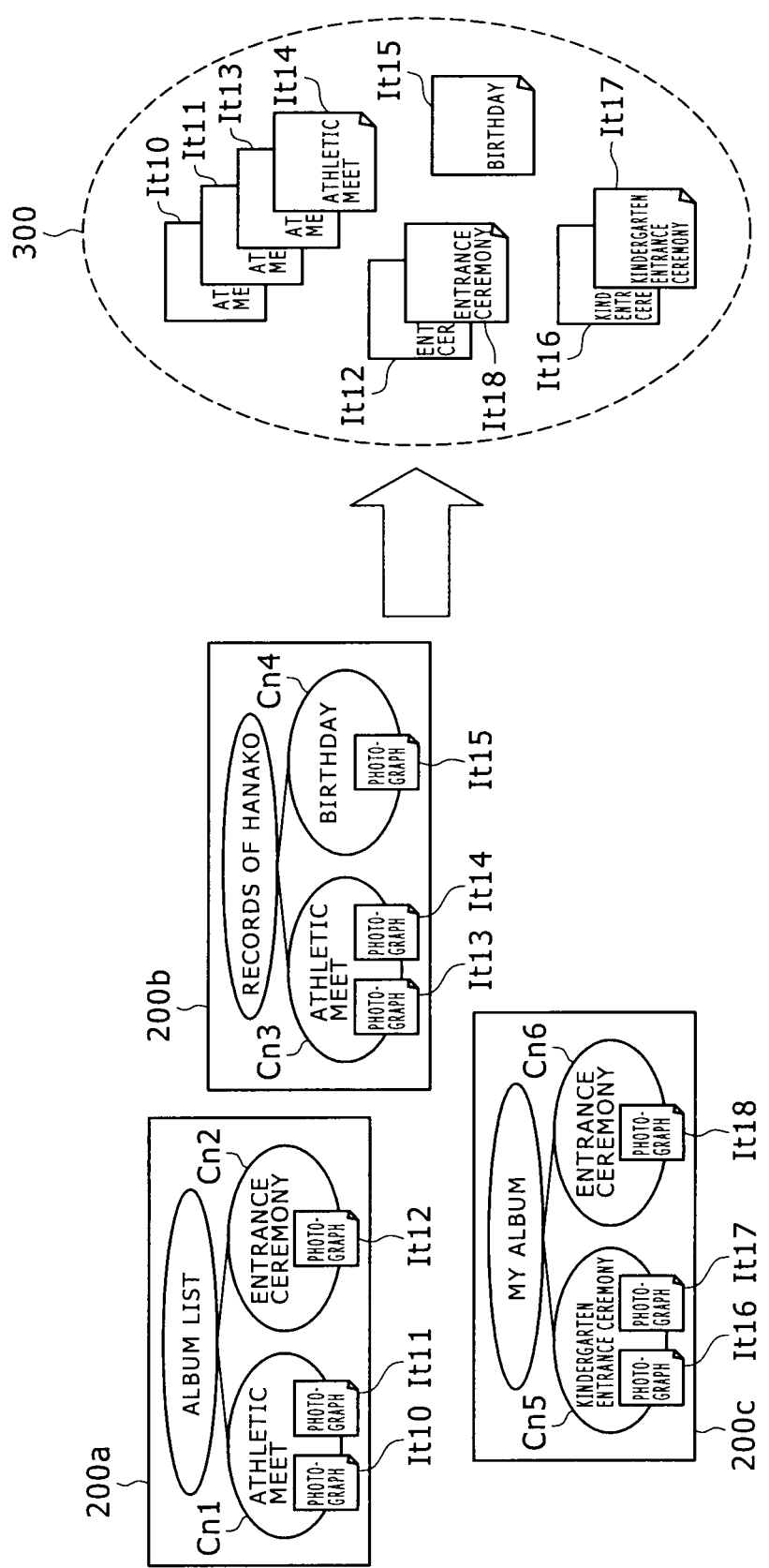
FIG. 10 is a diagram of assistance in explaining an example of category classification according to an embodiment of the present invention.

FIG. 10 shows an example of CDS in the DLNA server 200 and an example of registration of the content DB 322 generated on the basis of the content management information of the DLNA server 200 in the collecting server 300. FIG. 10 shows that containers classified as "ATHLETIC MEET" are present as a container Cn1 within a DLNA server 200a and as a container Cn3 within a DLNA server 200b. The container Cn1 stores an item It10 and an item It11, which are photograph contents, whereas the container Cn3 stores an item It13 and an item It14, which are photograph contents.

In the present example, in this case, "ATHLETIC MEET", which is the name of the parent containers of the item It10, the item It11, the item It13, and the item It14, is recorded as a category of the items in the content DB 322. Thereby, even when the items are recorded separately in the DLNA server 200a and the DLNA server 200b, the collecting server 300 can treat the items as belonging to the same category of "ATHLETIC MEET". Thus, by specifying the category of "ATHLETIC MEET", the user can easily find the item It10, the item It11, the item It13, and the item It14 belonging to this category.

The names of containers are the names of folders created by the user to classify contents. In the example shown in FIG. 10, the name of the container Cn1 is "ATHLETIC MEET", the name of a container Cn2 is "ENTRANCE CEREMONY", and the name of a container Cn4 is "BIRTHDAY". Thus, the names of containers are often meaningful to the user. Hence, by thus enabling an item (content) to be retrieved by the name of a parent container storing the item, efficiency of content search by the user can be improved.

In addition, because a simple method of associating an item with the name of the parent container and registering the name of the parent container as metadata of the item is used, even when a mechanism is created in the future in which mechanism the DLNA server 200 automatically generates a content classifying tree structure, the method can be easily applied without specifications being changed.

Incidentally, while the above embodiment has been described by taking an example where information added as metadata of an item to the content DB 322 is the name of a parent container storing the item, not only the name of the parent container but also the name of a container in a layer even higher than that of the parent container may be associated with the item and registered at the same time.

Figure 11:
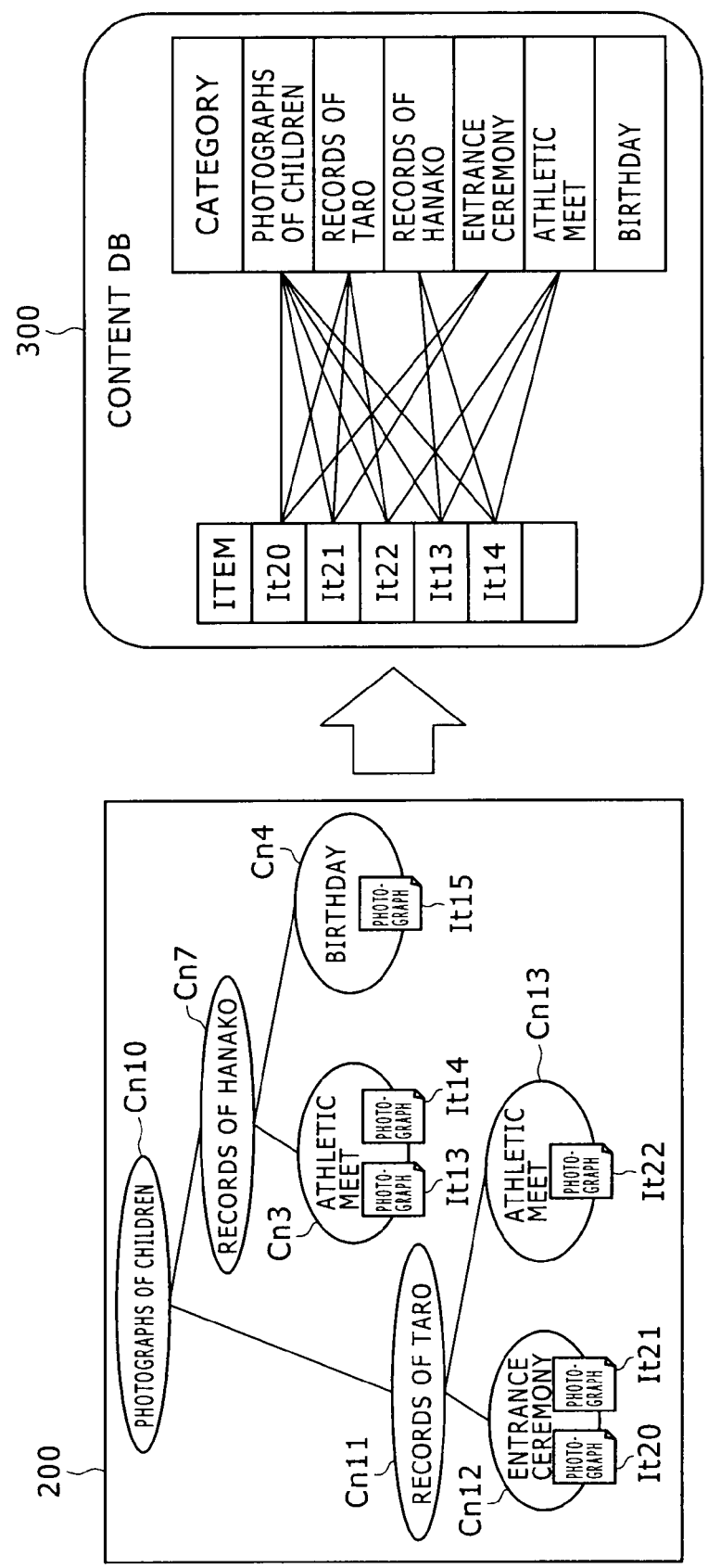
FIG. 11 is a diagram of assistance in explaining an example of registration of a content database according to another embodiment of the present invention.

An example of CDS in the DLNA server 200 and an example of registration of the content DB 322 in the collecting server 300 in this case is shown in FIG. 11. In the example shown in FIG. 11, with a container Cn10 named "PHOTOGRAPHS OF CHILDREN" at a top, a container Cn7 named "RECORDS OF HANAKO" and a container Cn11 named "RECORDS OF TARO" are hanging under the container Cn10. Then, a container Cn3 named "ATHLETIC MEET" and a container Cn4 named "BIRTHDAY" are connected directly under the container Cn7 having the name of "RECORDS OF HANAKO". The container Cn3 having the name of "ATHLETIC MEET" stores an item It13 and an item It14, which are photograph contents. The container Cn4 having the name of "BIRTHDAY" stores an item It15, which is a photograph content.

A container Cn12 named "ENTRANCE CEREMONY" and a container Cn13 named "ATHLETIC MEET" are connected under the container Cn11 having the name of "RECORDS OF TARO". The container Cn12 having the name of "ENTRANCE CEREMONY" stores an item It20 and an item It21, which are photograph contents. The container Cn13 having the name of "ATHLETIC MEET" stores an item It22, which is a photograph content.

When the content DB is created from content management information of such a structure, in the example shown in FIG. 11, not only the name of a container storing an item but also the name of a container in a layer above that container is registered together. In the case of the item It20, for example, not only "ENTRANCE CEREMONY" as the name of the parent container Cn12, but also "RECORDS OF TARO" as the name of the parent container Cn11 of the container Cn12 and "PHOTOGRAPHS OF CHILDREN" as the name of the container Cn10 above the container Cn11 are associated with the item It20 and stored in the content DB 322 as metadata of the item It20.

Similarly, also in the case of the item It13, not only "ATHLETIC MEET" as the name of the parent container Cn3, but also "RECORDS OF HANAKO" as the name of the parent container Cn7 of the container Cn3 and "PHOTOGRAPHS OF CHILDREN" as the name of the container Cn10 one layer above the container Cn7 are registered as metadata of the item It13.

When the names of containers in a plurality of layers are thus handled, items and the containers are not in one-to-one relation but are in many-to-many relation. Hence, the content DB 322 needs to use a relation table indicating relation between a table of the items and a table of the categories (container names).

Figure 12:
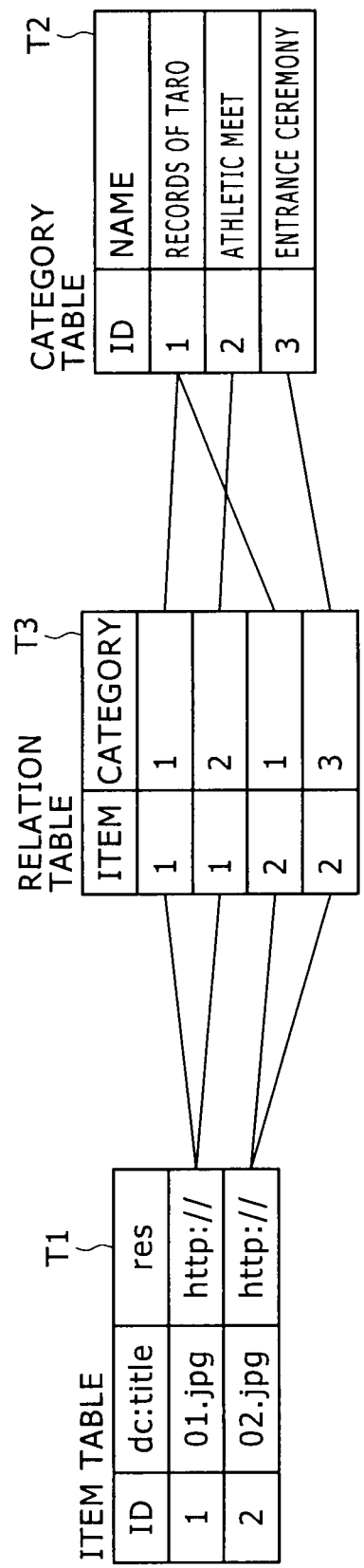
FIG. 12 is a diagram of assistance in explaining an example of relation between tables according to another embodiment of the present invention.

FIG. 12 shows an example of configuration of an item table, a category table, and a relation table. Suppose that the item table T1 has for example ID, dc:title, and res as items, and retains information on "01.jpg" and "02.jpg". Suppose that the category table T2 has categories such as "RECORDS OF TARO", "ATHLETIC MEET", and "ENTRANCE CEREMONY" recorded therein together with IDs.

Suppose that categories associated with "01.jpg" of the item ID1 are "RECORDS OF TARO" of the category ID1 and "ATHLETIC MEET" of the category ID2, and that categories associated with "02.jpg" of the item ID2 are "RECORDS OF TARO" of the category ID1 and "ENTRANCE CEREMONY" of the category ID3.

In this case, the many-to-many relation between the items and the categories can be represented by using the indirect table associating the items with the categories as shown as the relation table T3.

Figure 13:
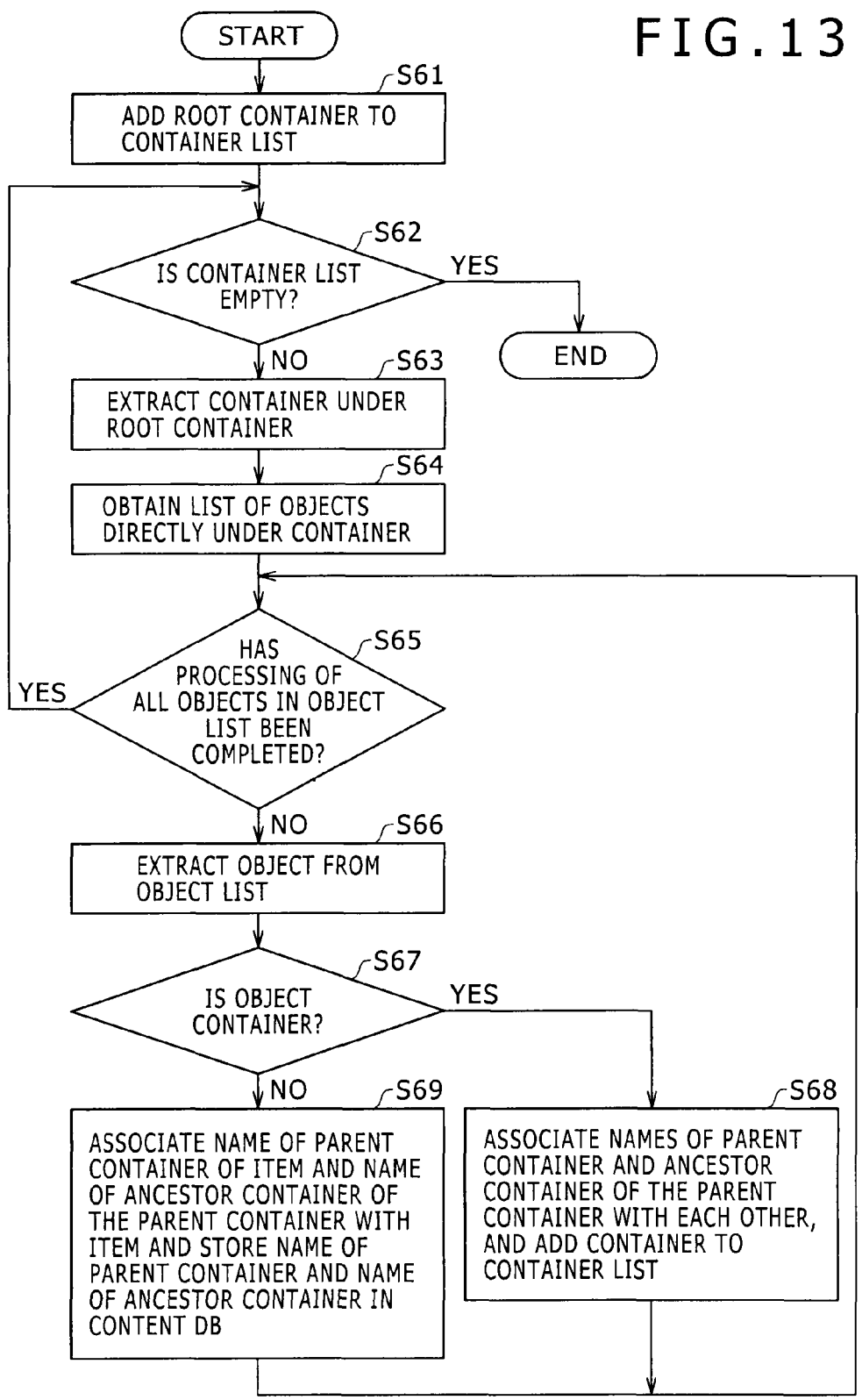
FIG. 13 is a flowchart representing an example of a process of generating a content database according to another embodiment of the present invention.
Figure 14:
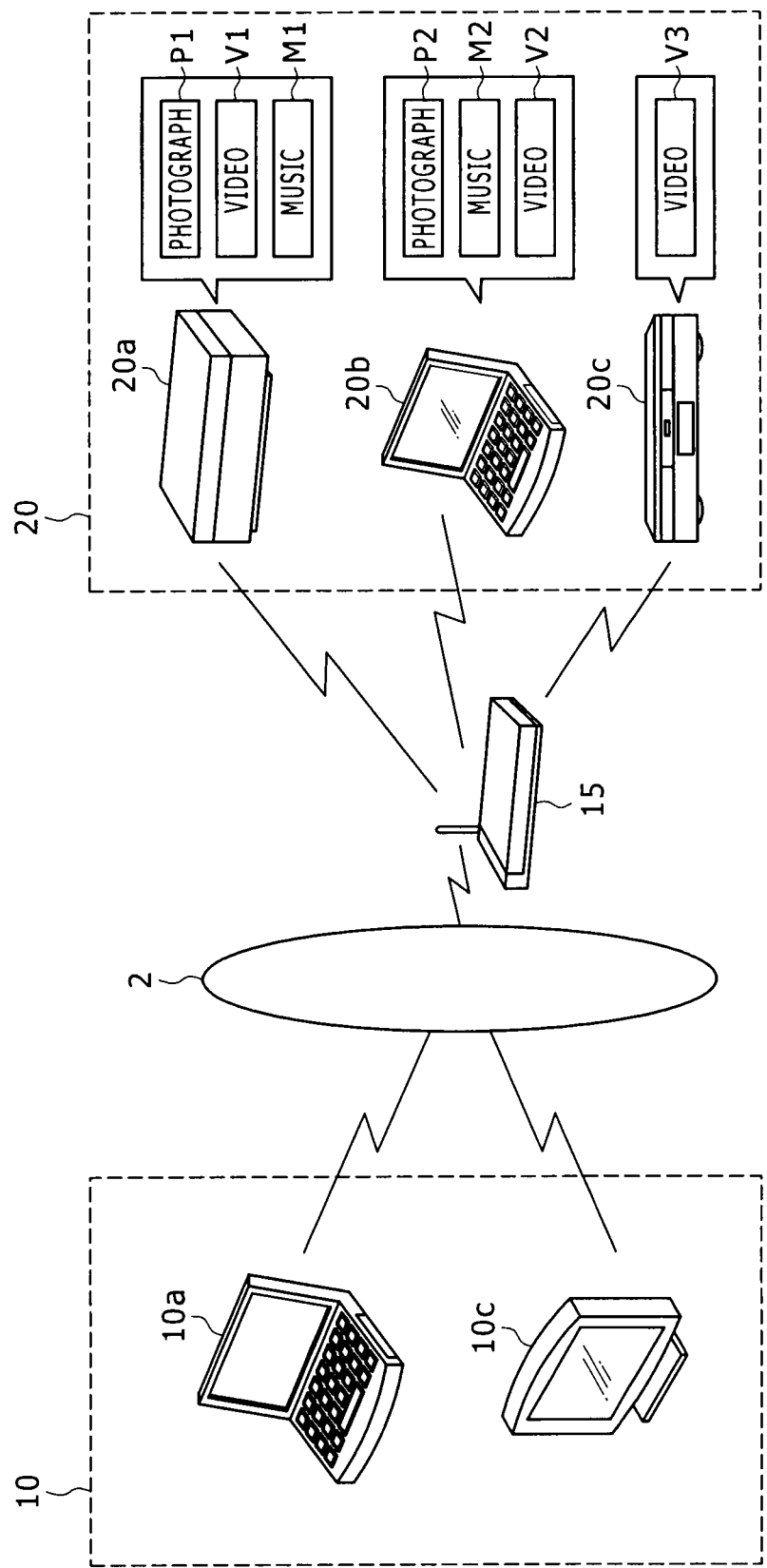
FIG. 14 is a block diagram showing an example of a system configuration of the past.

An example of a process of generating a content DB when items and categories are in many-to-many relation is shown in a flowchart of FIG. 13. Steps S61 to S67 are the same as steps S11 to S17 in the flowchart of FIG. 3, and therefore description thereof will be omitted. When it is determined in step S67 of FIG. 13 that an object is a container, the names of a parent container and a container (ancestor container) in a layer above the parent container are associated with each other, and the container is added to the container list (step S68). When it is determined that the object is not a container but is an item, the name of a parent container of the item and the name of an ancestor container thereof are associated with the item, and stored as metadata of the item in the content DB 322 (step S69).

By performing such a process, it is possible to use not only the name of a container storing an item (content) but also the name of a container in a layer above the container storing the item when searching for the content.

As noted above, identical content may be stored in more than one place on a network. In such a case, there will be multiple entries in the item table with the same name. However, different entries in the relation table and in category table for these objects, reflecting the different locations of the identical content, will allow a user to discriminate between multiple versions of the same object in different locations on a network.

In the foregoing embodiment, an example has been taken in which the names of parent containers of items are displayed in a list and a desired key is selected from the names when content is retrieved on the DLNA client 100. However, the present invention may be applied to a case where a search is performed by keyword. In this case, it suffices for the collecting server 300 to extract a category in the content DB 322 with a keyword input by the user as a key, and output items belonging to the extracted category in a form of a list to the DLNA client 100.

In the foregoing embodiment, an example has been described in which the collecting server 300 is operated on a device independent of the DLNA client 100 and the DLNA server 200. However, the present invention can be applied to a configuration in which the functions of the DLNA client and the collecting server are implemented on one device by setting the modules of the collecting server 300 on the DLNA client 100.

While the foregoing embodiment has been described by taking a case of processing photograph contents as an example, the present invention is applicable to other contents, such as video and audio content. A particularly great effect can be obtained when there are a few kinds of metadata and contents are of a type without many search keys.

The series of processes in the foregoing embodiment can be performed not only by hardware but also by software. When the series of processes is to be carried out by software, a program constituting the software is installed and executed on a computer incorporated in dedicated hardware, or for example a general-purpose personal computer that can perform various functions by installing various programs thereon.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
   a client configured to receive and reproduce content from a media server; and
   a collecting server, including a processor, configured to receive content management information on said content from said media server and to manage said content management information, said content management information being different than said content, said content management information including a thumbnail image representing said content and a creation time and date of the content, said collecting server configured to obtain at predetermined intervals a flag changed by determining that a change is made to said content and to obtain only said content management information including the thumbnail image and the creation time and date of the content and not said content from said media server by reading from a value of the obtained flag that a change has been made to said content;
wherein said client includes
    a communication unit configured to transmit a search condition for retrieving said content to said collecting server, and to receive a list of content information corresponding to said search condition, said collecting server includes
    a receiving unit configured to obtain said content management information from said media server according to a predetermined condition,
    a content information database generating unit configured to store information on a content storage location which information is included in the obtained content management information as category information of said content, and to generate a content information database,
    a content information list generating unit configured to extract content information matching said search condition from said content information database on a basis of said category information and to generate a list of said content information by receiving a search condition transmitted from said client, and
    a transmitting unit configured to transmit the list of said content information generated by said content information list generating unit to said client.

2. The information processing system according to claim 1, wherein said content management information includes root information of said content stored in said media server, name information of a folder storing said content, name information of said content, and hierarchical structure information of said folder.

3. The information processing system according to claim 1, wherein said collecting server further includes a category list generating unit configured to generate a category list on a basis of said category information,
    said transmitting unit is configured to transmit said category list generated by said category list generating unit to said client, and
    said collecting server is configured to transmit a list of content information belonging to said specific category when receiving a selection signal to select a specific category as said search condition from the category list.

4. The information processing system according to claim 3, wherein said collecting server is configured to transmit content information including name information of said content and category information as information on said content storage location.

5. The information processing system according to claim 4, wherein said media server is configured to transmit said specific content when said client is operated to select a specific content from the list of said content information.

6. The information processing system according to claim 1, wherein said collecting server further includes a content information searching unit configured to obtain pieces of said content management information stored in said media server piece by piece in order from an uppermost layer of a folder hierarchical structure of said content management information in a direction of lower layers.

7. The information processing system according to claim 6, wherein said collecting server further includes a folder name storing unit configured to store a folder name when the content management information obtained by said content information searching unit includes said folder name.

8. The information processing system according to claim 7, wherein said content information searching unit is configured to extract said folder name stored in said folder name storing unit one by one, and to output a request to obtain content management information stored under a folder having the extracted folder name to said communication unit.

9. The information processing system according to claim 8, wherein the content information database generating unit of said collecting server is configured to store a folder name extracted from said folder name storing unit by said content information searching unit as attribute information of said content only when the obtained content management information includes name information of said content.

10. A collecting server in an information processing system, said information processing system including a client configured to receive and reproduce content from a media server and a collecting server configured to receive content management information on said content from said media server and to manage said content management information, said collecting server comprising:
    a receiving unit, including a processor, configured to obtain said content management information from said media server according to a predetermined condition, said content management information being different than said content, said content management information including a thumbnail image representing said content and a creation time and date of the content, said receiving unit configured to obtain at predetermined intervals a flag changed by determining that a change is made to said content and to obtain only said content management information including the thumbnail image and the creation time and date of the content and not said content from said media server by reading from a value of the obtained flag that a change has been made to said content;
    a content information database generating unit configured to store information on a content storage location which information is included in the obtained content management information as category information of said content, and to generate a content information database;
    a content information list generating unit configured to extract content information matching said search condition from said content information database on a basis of said category information and to generate a list of said content information by receiving a search condition transmitted from said client; and
    a transmitting unit configured to transmit the list of said content information generated by said content information list generating unit to said client.

11. An information processing method of a collecting server in an information processing system, said information processing system including a client configured to receive and reproduce content from a media server and a collecting server for receiving content management information on said content from said media server and managing said content management information, said information processing method comprising:
    obtaining said content management information from said media server according to a predetermined condition, said content management information being different than said content, said content management information including a thumbnail image representing said content and a creation time and date of the content, said obtaining including obtaining at predetermined intervals a flag changed by determining that a change is made to said content, and obtaining only said content management information including the thumbnail image and the creation time and date of the content and not said content from said media server by reading from a value of the obtained flag that a change has been made to said content;

storing information on a content storage location which information is included in the obtained content management information as category information of said content;

extracting content information matching said search condition on a basis of said category information and generating a list of said content information by receiving a search condition for said content from said client; and transmitting the generated list of said content information to said client.

12. A non-transitory computer readable medium storing a program which, when loaded on a processor, causes the processor to execute a method for implementing and performing an information process of a collecting server in an information processing system on a computer, said information processing system including a client configured to receive and reproduce content from a media server and a collecting server for receiving content management information on said content from said media server and managing said content management information, said method comprising:

obtaining said content management information from said media server according to a predetermined condition, said content management information being different than said content, said content management information including a thumbnail image representing said content and a creation time and date of the content, said obtaining including obtaining at predetermined intervals a flag changed by determining that a change is made to said content, and obtaining only said content management information including the thumbnail image and the creation time and date of the content and not said content from said media server by reading from a value of the obtained flag that a change has been made to said content;

storing information on a content storage location which information is included in the obtained content management information as category information of said content;

extracting content information matching said search condition on a basis of said category information and generating a list of said content information by receiving a search condition for said content from said client; and transmitting the generated list of said content information to said client.

13. An information processing system comprising:
a processor;
client means for receiving and reproducing content from a media server; and
collecting means for receiving content management information on said content from said media server and to manage said content management information, said content management information being different than said content, said content management information including a thumbnail image representing said content and a creation time and date of the content, said collecting server configured to obtain at predetermined intervals a flag changed by determining that a change is made to said content and to obtain only said content management information including the thumbnail image and the creation time and date of the content and not said content from said media server by reading from a value of the obtained flag that a change has been made to said content;

wherein said client means includes
communication means for transmitting a search condition for retrieving said content to said collecting means, and for receiving a list of content information corresponding to said search condition, said collecting means includes
means for obtaining said content management information from said media server according to a predetermined condition,
content information database generating means for storing information on a content storage location which information is included in the obtained content management information as category information of said content, and for generating a content information database,
content information list generating means for extracting content information matching said search condition from said content information database on a basis of said category information and to generate a list of said content information by receiving a search condition transmitted from said client means, and
means for transmitting the list of said content information generated by said content information list generating means to said client means.

14. A collecting server in an information processing system, said information processing system including a client for receiving and reproducing content from a media server and a collecting server for receiving content management information on said content from said media server and for managing said content management information, said collecting server comprising:

means for obtaining said content management information from said media server according to a predetermined condition, said content management information being different than said content, said content management information including a thumbnail image representing said content and a creation time and date of the content, said collecting server configured to obtain at predetermined intervals a flag changed by determining that a change is made to said content and to obtain only said content management information including the thumbnail image and the creation time and date of the content and not said content from said media server by reading from a value of the obtained flag that a change has been made to said content;

content information database generating means for storing information on a content storage location which information is included in the obtained content management information as category information of said content, and for generating a content information database;

content information list generating means for extracting content information matching said search condition from said content information database on a basis of said category information and for generating a list of said content information by receiving a search condition transmitted from said client; and means for transmitting the list of said content information generated by said content information list generating means to said client.

* * * * *